Jan. 3, 1956 B. B. BRIANT 2,729,135
REFRACTOMETER FOR LIQUIDS
Filed Dec. 18, 1952 2 Sheets-Sheet 1

BOB B. BRIANT
INVENTOR.

BY Hubert Miller
ATTORNEY

BOB B. BRIANT
INVENTOR.

United States Patent Office 2,729,135
Patented Jan. 3, 1956

2,729,135

REFRACTOMETER FOR LIQUIDS

Bob B. Briant, Wichita, Kans., assignor to Boeing Airplane Company, Wichita, Kans., a corporation of Delaware Application December 18, 1952, Serial No. 326,743

2 Claims. (Cl. 88—14)

This invention relates to an improved refractometer, and more particularly to an improved instrument of this type for accurately determining the indices of refraction of various liquids.

Instruments for this purpose are presently available, but most of them are both expensive and complicated. An interferometer, for example, requires the visual matching of interference fringes by a highly skilled operator. Such procedure is tiring, and accuracy depends on the operator, thus making such instruments subjective in their method of operation. The same applies to reflectometers.

This invention provides a much simpler and more rugged instrument which is accurate, yet which is objective in its method of operation, and therefore does not require a skilled operator.

This invention is based on the theory that the focal length of a condensing lens is a function of the radii of curvature of the lens faces and the index of refraction of the substance of which the lens is made. If the lens substance is a liquid, then its index of refraction can be obtained by first accurately determining its focal length, and comparing that focal length with the focal length of a similar lens of a liquid whose index of refraction is known. Rather than actually requiring a comparison, however, the instrument is accurately calibrated, and the index of refraction of the liquid being tested is read directly.

It is the chief object of the invention to provide a rugged instrument which is simple in construction, and which may be used by unskilled operators at points remote from any laboratory; one which can be transported from place to place without destroying its accuracy.

It is a further object to provide an accurate refractometer which omits many expensive and complicated components which are included in most presently available refractometers. For instance, a refractometer embodying my invention includes no observation telescope, no filters for producing a monochromatic light beam, no collimating lens, no series of prisms, no mirror reflector, no photoelectric cell or other split radiation detector, no differential glavanometer, and no differential electronic amplifier.

The invention, together with other objects, will be more clearly understood when the following description is read in connection with the drawings, in which.

*General construction and operation*

Figure 4:
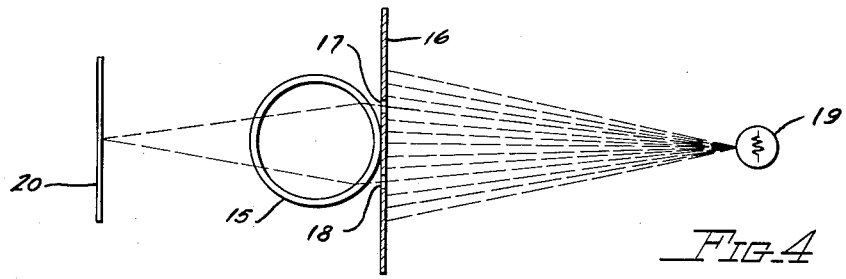
Fig. 4 is a schematic view illustrating the principle of operation of the refractometer.

Fig. 4 illustrates schematically the general construction and operation of a refractometer embodying my invention. A condensing lens 15 is a liquid filled substantially cylindrical thin walled glass tube or bottle. An image producing shield or blanking screen 16 is fixed adjacent the bottle wall, and is provided with spaced apertures 17 and 18, spanned by image producing strands. A source of light 19 is spaced from shield 16, and light rays from this source pass through apertures 17 and 18, through the lens 15, are deflected inward thereby, and intersect at some point spaced from the opposite side of the lens. A thin translucent image receiving screen 20 is mounted parallel to shield 16 for movement toward and away from the lens 15 along a line passing through the axes of the lens and of the light source. The screen 20 serves as a detector to determine the exact point at which the lens deflected light rays intersect. The converging rays are clearly visible on the surface of the screen, and when it is moved to the proper position the two light images coincide and appear as a single image. Since the distance between the lens and the point of intersection of the deflected rays is the focal length of the lens formed by the liquid and the bottle, it is only necessary to provide a moderately fine micrometer screw (not shown in Fig. 4) to move screen 20 toward and away from the lens, and to properly calibrate the screw, to convert various focal lengths directly into index of refraction readings.

*Detailed construction*

Figures 1, 2:
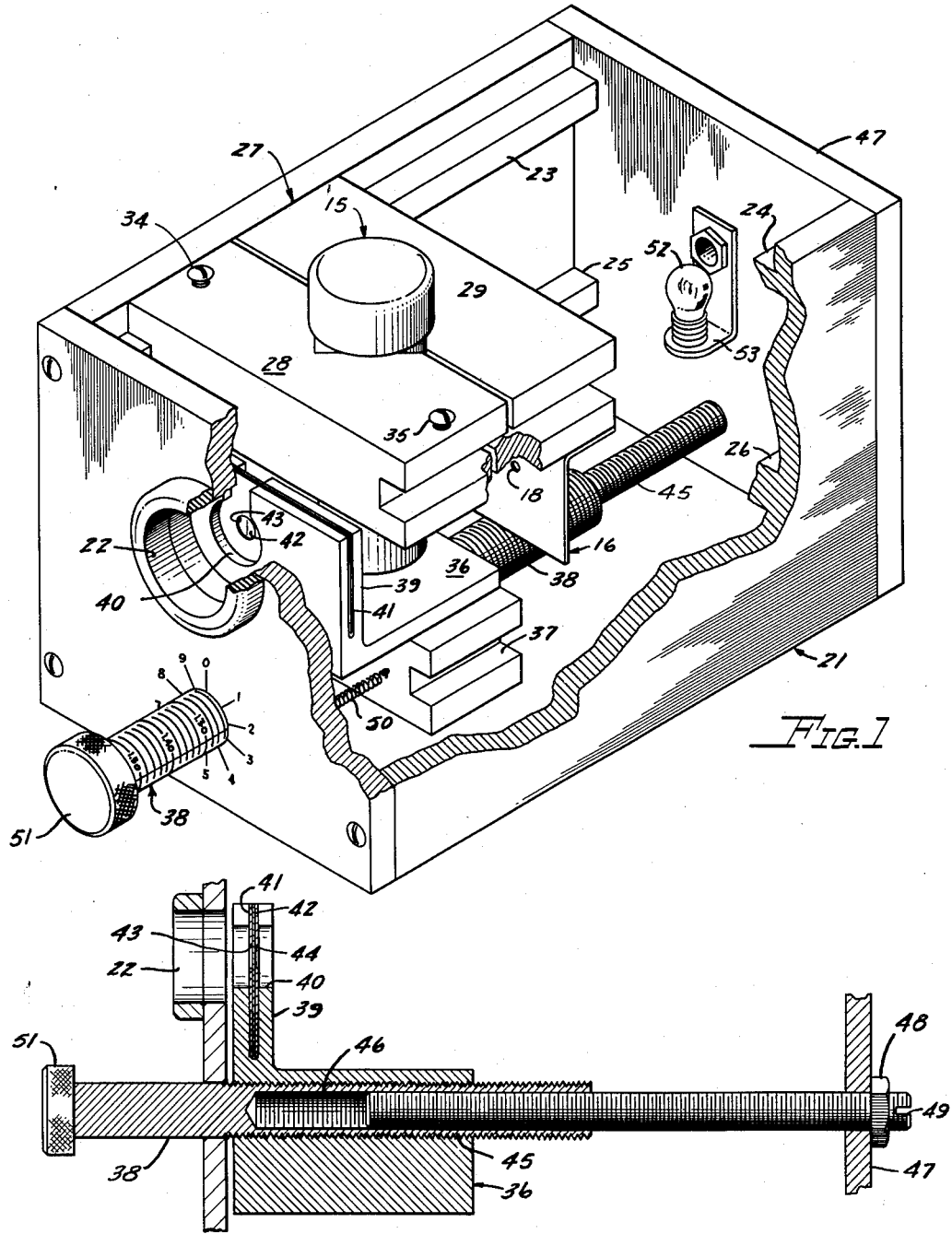
Fig. 1 is a perspective view of a complete refractometer embodying the invention, parts being cut away for clarity.
Fig. 2 is a sectional view showing details in construction of certain parts.

Referring to Fig. 1, the refractometer illustrated includes a box-like housing 21 having an open observation aperture 22 in one of its ends. Interiorly the side walls of the housing carry inwardly projecting oppositely positioned and parallel ribs 23—24 and 25—26, which together form two vertically spaced parallel slideways.

Figure 3:
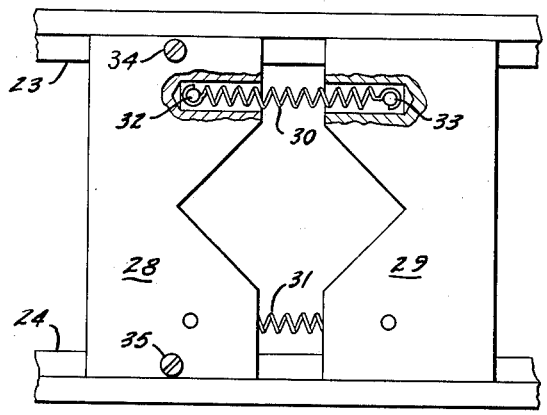
Fig. 3 is a plan view of a clamp, portions being shown in section to disclose details in construction.

A lens holding clamp 27 is mounted for slidable movement on the two upper ribs 23 and 24. This clamp is made up of two halves 28 and 29, each having slots in its opposite ends to receive and cooperate with the ribs. Along their adjacent side edges the two halves are recessed, as shown in Fig. 3, to form a lens receiving socket between them. Clamping pressure is provided by a pair of tension coil springs 30 and 31, the opposite ends of which are enclosed in aligned recesses in the respective halves, and anchored by pins 32 and 33. The springs normally maintain the adjacent side edges of the two halves in contact. In use, one half 28 is secured against movement along the ribs by means of set screws 34 and 35. The block 29 may thus be grasped manually and pulled slightly away from block 28 to open the socket so that the lens may be inserted. When block 29 is released, spring pressure clamps the lens 15 between the blocks at any desired elevation. It will be understood, of course, that other types of clamps will serve as suitable substitutes for the one described.

On the lower set of ribs 25 and 26, a traveling focal length detector, designated as a whole by the numeral 36, is slidably mounted by means of rib receiving slots 37 in each of its side edges. Detector 36 has a threaded longitudinally extending bore which receives the exteriorly threaded sleeve 38 of a compound micrometer screw, which will presently be described in detail. At one end, the detector 36 carries an upright plate 39 which is provided with a central viewing aperture 40 which is centrally aligned with aperture 22 in the housing end wall.

The plate 39 is slotted transversely to receive and resiliently grip a reversely folded sheet 41 of thin gage metal which holds in its fold a very thin sheet of translucent material, such as frosted glass, Plexiglas, silk, or oiled paper, which constitutes an image receiving screen 42. The two sides of folded sheet 41 are provided with concentric apertures 43 and 44 (Fig. 2), which are also concentric with plate aperture 40 and housing wall aperture 22. A line passing through the center of the source of light and through the longitudinal axis of the lens 15 also passes through the center of all the mentioned apertures 40, 44, 43 and 22. With the entire detector 36 mounted on threaded sleeve 38 as a traveling nut, it can readily be seen that rotation of the sleeve will move translucent focal length detector screen 42 toward and away from lens 15.

The previously mentioned compound micrometer screw includes the sleeve 38 and a fixed screw 45, one end of which is received in a complementally threaded bore 46 of the sleeve, and the other end of which threadedly engages and projects through the back wall 47 of the housing. Rotation of this screw is normally prevented by a lock nut 48, which may be loosened and the position of the screw adjusted by means of a screw driver slot 49 in the end of the screw.

By externally threading sleeve 38 with right hand threads, 28 per inch, and screw 45 with right hand threads, 20 per inch, an extremely fine micrometer screw is produced. Actually sleeve 38 may be rotated 28 complete revolutions while moving screen 42 only four-tenths of one inch toward or away from lens 15. A pair of laterally spaced tension coil springs 50 each has one end secured to the detector 36 and its other end secured to the front wall of the housing. These springs 50 serve to eliminate any possible lead error in the threads on the detector, the sleeve 38, or the screw 45.

Sleeve 38 is unthreaded near its outer end, and is journaled in the front wall of the housing. That portion which normally projects outward from the housing wall is accurately calibrated for direct reading of indices of refraction. The outer surface of the wall immediately surrounding the sleeve is calibrated in tenths to provide a vernier scale. A knurled knob 51 is mounted on the extreme outer end of sleeve 38 to facilitate its adjustment.

A small electric bulb 52 is mounted in a bracket support 53 on the inner surface of the back wall 47, as shown, and serves as the source of light previously mentioned.

Figure 5:
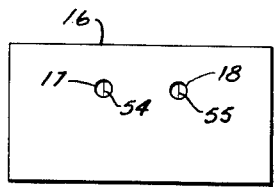
Fig. 5 is a plan view of a preferred form of light shield forming a part of the invention.

The twin apertured shield 16 is secured, as by screws, to the nether surface of clamp half 29, as clearly shown in Fig. 1. Referring to Fig. 5, it will be seen that fine parallel vertically disposed hairs or web strands 54 and 55 are secured centrally across the shield apertures 17 and 18. Since it is desirable for the sake of accuracy to project extremely fine images on translucent detector screen 42, short lengths of spider web strands are preferably used instead of hairs. The strands 54 and 55 are preferably cemented directly to the surface of shield 16.

*Operation*

Figures 6, 7:
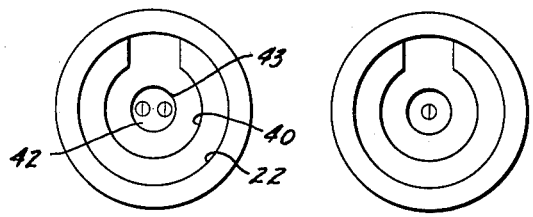
Figs. 6 and 7 are front views through an observation window in the refractometer, and illustrate the manner in which a null point reading is obtained to accurately determine the focal length of the lens formed by the liquid being tested.

A selected liquid is placed in the lens bottle, and the bottle is positioned in clamp 27. When bulb 52 is energized light rays pass through shield apertures 17 and 18, through the condensing lens formed by the bottle walls and the liquid, and hairline images are projected onto the surface of translucent detector screen 42, as clearly shown in Figs. 6 and 7. In Fig. 6, it is evident that screen 42 has not yet been moved to the exact plane in which the lens deflected rays intersect. By simply turning knob 51 in one direction or the other, detector 36 moves along sleeve 38 to move screen 42 into the proper plane so that the two separate projected images exactly coincide, and appear as a single image, as in Fig. 7. Thus, a null reading is obtained.

By then reading the calibrations on the outer end of sleeve 38, the index of refraction of the liquid in the bottle is obtained. In Fig. 1, the reading is 1.2423.

While it is true that the radius of the lens remains constant, and that the lens substance (the liquid) is a variable, the distance the light rays travel through the bottle walls is very small compared to the distance which the rays travel through the liquid. Any deviation due to the glass portion of the lens is eliminated during calibration of the sleeve 38, and therefore has no effect on the final readings. Effects of temperature variations on the lead screws 38 and 45 can easily be compensated for by filling the bottle with a liquid whose index of refraction is known, by adjusting knob 51 until the scale reads the known index of refraction, by loosening nut 48 and adjusting screw 45 until the two light projected images of strands 54 and 55 coincide on screen 42, as in Fig. 7.

From the above description, it is evident that this invention provides a means of accurately determining the focal length of a condensing lens which is made up primarily of the liquid being tested, and converting that focal length into an index of refraction reading for the particular liquid of which the lens is formed. While only a cylindrical condensing lens is shown in the drawings, it will be understood by those familiar with this art that other types and shapes of liquid filled condensing lenses will serve equally well.

Having described the invention with sufficient clarity to enable those familiar with this art to construct and use it, I claim:

1. A device for determining the index of refraction of a substance comprising, in combination: a thin walled cylindrical transparent container for holding the substance, the substance and the container wall together constituting a condensing lens; a source of light on one side of said lens; an apertured otherwise light impervious image creating shield interposed transversely between the lens and the light source; a translucent image receiving focal length detecting screen on the opposite side of the lens, the light source, the shield, the lens and the screen all being in optical alignment, said shield having two apertures spaced equidistant from the line of optical alignment on opposite sides thereof; means supporting said container in fixed position with relation to said shield and the source of light; a movable member supporting said screen in a plane substantially perpendicular to the line of optical alignment; a compound micrometer type screw supporting said movable member for movement along the line of optical alignment; means journaling the screw; and cooperating means on the screw and on the screw journaling means to measure a distance between the lens and screen proportional to the index of refraction of the lens substance when the two light images created by the shield coincide on the screen.

2. The device described in claim 1, and means for adjusting one part of the compound screw with relation to another part to compensate for length variation in the screw due to temperature changes.

References Cited in the file of this patent

UNITED STATES PATENTS

| | | |
|---|---|---|
| 236,911 | Scharpf | Jan. 25, 1881 |
| 1,988,169 | Duckwall | Jan. 15, 1935 |
| 2,595,495 | Von Berg et al. | May 6, 1952 |

FOREIGN PATENTS

| | | |
|---|---|---|
| 5,281 | Great Britain | of 1892 |
| 11,200 | Great Britain | of 1905 |
| 15,535 | Great Britain | of 1905 |
| 313,261 | Great Britain | June 13, 1929 |
| 591,991 | Great Britain | Sept. 4, 1947 |